United States Patent
Fujii et al.

(10) Patent No.: US 12,398,933 B2
(45) Date of Patent: Aug. 26, 2025

(54) CHILLER

(71) Applicant: SMC CORPORATION, Chiyoda-ku (JP)

(72) Inventors: Kunihide Fujii, Tsukubamirai (JP); Yohei Tobe, Tsukubamirai (JP); Toshiki Sasatani, Moriya (JP)

(73) Assignee: SMC CORPORATION, Chiyoda-ku (JP)

( * ) Notice: Subject to any disclaimer, the term of this patent is extended or adjusted under 35 U.S.C. 154(b) by 303 days.

(21) Appl. No.: 18/005,518

(22) PCT Filed: Jul. 8, 2021

(86) PCT No.: PCT/JP2021/025707
§ 371 (c)(1),
(2) Date: Jul. 12, 2023

(87) PCT Pub. No.: WO2022/014450
PCT Pub. Date: Jan. 20, 2022

(65) Prior Publication Data
US 2024/0011681 A1    Jan. 11, 2024

(30) Foreign Application Priority Data
Jul. 17, 2020   (JP) ................................ 2020-123202

(51) Int. Cl.
*F25B 25/00*    (2006.01)
*B23K 26/70*    (2014.01)
*F25B 41/31*    (2021.01)

(52) U.S. Cl.
CPC .......... *F25B 25/005* (2013.01); *B23K 26/703* (2015.10); *F25B 41/31* (2021.01)

(58) Field of Classification Search
CPC ........ F25B 25/005; F25B 25/00; F25B 41/31; F25B 9/006; F25B 7/00; B23K 26/703
See application file for complete search history.

(56) References Cited

U.S. PATENT DOCUMENTS 11,998,417  B2     6/2024  Herrmann
2014/0090409 A1 *  4/2014  Yamashita .............. F25B 49/02
                                                        62/196.1
2016/0076821 A1 *  3/2016  Kopko ................ F28D 20/0039
                                                          165/10

FOREIGN PATENT DOCUMENTS

CN   110651160 A   1/2020
EP   2 910 871 A1  8/2015
(Continued)

OTHER PUBLICATIONS

International Search Report Issued Aug. 17, 2021 in PCT/JP2021/025707 filed Jul. 8, 2021, 2 pages.
(Continued)

*Primary Examiner* — Miguel A Diaz
(74) *Attorney, Agent, or Firm* — Oblon, McClelland, Maier & Neustadt, L.L.P.

(57) ABSTRACT

[Object] To provide a chiller reduced in size, cost, and energy use.
[Solution] A chiller C1 includes a tank 1, a pump 2, a plurality of coolant circuits 3 and 4 configured to cool a plurality of respective loads, and a refrigeration circuit 5. The plurality of coolant circuits 3 and 4 and the refrigeration circuit 5 are connected to each other via respective heat exchangers 6 and 7 capable of individually controlling cooling performance. The first heat exchanger 6 connecting the first coolant circuit 3 and the refrigeration circuit 5 is configured to control a temperature of a coolant that returns from a first load W1 and a second load W2 to the tank 1. The second heat exchanger 7 connecting the second coolant circuit 4 and the refrigeration circuit 5 is configured to control a temperature of the coolant that is supplied from the tank 1 to the second load W2.

7 Claims, 2 Drawing Sheets

(56) References Cited

FOREIGN PATENT DOCUMENTS

| EP | 3 859 236 A1 | 8/2021 |
|---|---|---|
| JP | 5-17535 Y2 | 5/1993 |
| JP | 2004-28554 A | 1/2004 |
| JP | 2008-75919 A | 4/2008 |
| JP | 2011-89663 A | 5/2011 |
| JP | 2011-163698 A | 8/2011 |
| JP | WO 2014/045394 A1 | 3/2014 |
| WO | WO 2020/100206 A1 | 5/2020 |
| WO | WO 2020/100324 A1 | 5/2020 |

OTHER PUBLICATIONS

Taiwanese Office Action issued Oct. 14, 2024 in Taiwanese Patent Application No. 11321049530 with English translation, 20 pgs.
Combined Chinese Office Action and Search Report issued Mar. 19, 2025 in Chinese Patent Application No. 202180061088.6 (with English translation of Office Action only), 13 pages.

\* cited by examiner

CHILLER

TECHNICAL FIELD

The present invention relates to chillers configured to supply a coolant whose temperature is controlled to a load and thus configured to keep the temperature of the load constant. More specifically, the present invention relates to a chiller capable of keeping the temperatures of a plurality of loads constant.

BACKGROUND ART

Chillers configured to supply a coolant whose temperature is controlled to a plurality of loads and thus configured to keep the temperatures of the plurality of loads constant are publicly known as disclosed in, for example, Patent Literatures (PTLs) 1 to 3.

A chiller (first chiller) disclosed in PTL 1 includes a refrigeration circuit, two coolant circuits configured to supply a coolant to two respective loads, and two heat exchangers that individually connect the refrigeration circuit and the two respective coolant circuits. One of the heat exchangers controls the temperature of the coolant in one of the coolant circuits. The other of the heat exchangers controls the temperature of the coolant in the other of the coolant circuits.

The first chiller controls the temperature of the coolant in each of the two coolant circuits by using the two respective heat exchangers and is thus compatible with two loads having different temperatures. However, the first chiller includes the two coolant circuits each including a dedicated tank and a dedicated pump, thus increasing the cost. In addition, when the two coolant circuits and the refrigeration circuit are contained in a casing, the first chiller has a problem of increasing the size of the chiller.

On the other hand, chillers (second and third chillers) disclosed in PTL 2 and PTL 3 each include a tank, a pump, and a plurality of coolant circuits and are each configured to supply a coolant discharged from the pump so as to be distributed to the plurality of coolant circuits and configured to cool a plurality of loads by using the coolant circuits. These chillers each use one tank and one pump and thus can be reduced in size compared with the first chiller.

However, the second and third chillers are each configured to supply a coolant whose temperature is controlled by a heat exchanger so as to be distributed to the plurality of coolant circuits and are thus incompatible with a plurality of loads having different temperatures.

CITATION LIST

Patent Literature

PTL 1: Japanese Examined Utility Model Registration Application Publication No. 5-17535
PTL 2: Japanese Unexamined Patent Application Publication No. 2004-28554
PTL 3: Japanese Unexamined Patent Application Publication No. 2011-163698

SUMMARY OF INVENTION

Technical Problem

A technical object of the present invention is to provide a chiller having a rational structure that is reduced in size, cost, and energy use compared with existing chillers and that is compatible with a plurality of loads having different temperatures.

Solution to Problem

To solve the above problems, a chiller of the present invention includes: a tank that contains a coolant; a pump configured to discharge the coolant in the tank; a plurality of coolant circuits to which the coolant discharged by the pump is distributed and that are configured to supply the coolant to a plurality of respective loads; and a refrigeration circuit configured to control a temperature of the coolant such that the coolant is subjected to heat exchange with a refrigerant. The plurality of coolant circuits and the refrigeration circuit are connected to each other via respective heat exchangers capable of individually controlling heat exchange performance. The plurality of coolant circuits include a first coolant circuit configured to cool a first load, and a second coolant circuit configured to cool a second load having a temperature different from a temperature of the first load. A first heat exchanger connecting the first coolant circuit and the refrigeration circuit is configured to control a temperature of the coolant that returns from the first load and the second load to the tank. A second heat exchanger connecting the second coolant circuit and the refrigeration circuit is configured to control a temperature of the coolant that is supplied from the tank to the second load.

The present invention may be configured as follows. The first coolant circuit includes a first supply pipe conduit through which the coolant discharged from the pump is sent to the first load such that the temperature of the coolant is kept to a first preset temperature that is a temperature of the coolant in the tank, and a first return pipe conduit through which the coolant flowing from the first load returns to the tank. The first heat exchanger is connected to the first return pipe conduit. A temperature of the coolant in the first return pipe conduit is thus controlled by the first heat exchanger so as to be the first preset temperature, and the coolant thereafter flows into the tank. The second coolant circuit includes a branch pipe conduit that branches off from the first supply pipe conduit and that is connected to the second heat exchanger, a second supply pipe conduit through which the coolant whose temperature is controlled by the second heat exchanger so as to be a second preset temperature is sent to the second load, and a second return pipe conduit through which the coolant flowing from the second load returns to the tank. The second return pipe conduit is connected to the first return pipe conduit. The coolant in the second return pipe conduit thus joins the coolant in the first return pipe conduit.

In addition, in the present invention, a pressure control valve is connected to the second supply pipe conduit and is configured to control a pressure of the coolant flowing in the second coolant circuit so as to be a pressure different from a pressure of the coolant flowing in the first coolant circuit.

In addition, in the present invention, a filtering pipe conduit connecting the first supply pipe conduit and the first return pipe conduit may be provided in the first coolant circuit. A DI filter configured to control an electrical conductivity of the coolant and an electromagnetic valve configured to open and close the filtering pipe conduit may be connected to the filtering pipe conduit. A DI sensor configured to measure an electrical conductivity of the coolant flowing in the first return pipe conduit to open and close the electromagnetic valve may be connected to the first return pipe conduit.

Preferably, the filtering pipe conduit connects a position, in the first supply pipe conduit, closer to the first load than a position, in the first supply pipe conduit, where the branch pipe conduit branches off and a position, in the first return pipe conduit, closer to the first heat exchanger than a position, in the first return pipe conduit, where the second return pipe conduit joins.

In the present invention, the refrigeration circuit includes a first refrigerant pipe conduit connecting an outlet of a compressor and an inlet of a condenser, a second refrigerant pipe conduit connecting an outlet of the condenser and an inlet of the first heat exchanger, a third refrigerant pipe conduit connecting an outlet of the first heat exchanger and an inlet of the compressor, a fourth refrigerant pipe conduit connecting the first refrigerant pipe conduit and an inlet of the second heat exchanger, a fifth refrigerant pipe conduit connecting an outlet of the second heat exchanger and the inlet of the first heat exchanger, and a sixth refrigerant pipe conduit connecting the fourth refrigerant pipe conduit and the fifth refrigerant pipe conduit. A first expansion valve is connected to the second refrigerant pipe conduit. A second expansion valve is connected to the fifth refrigerant pipe conduit. A third expansion valve is connected to the sixth refrigerant pipe conduit.

In addition, in the present invention, the refrigeration circuit may include a first refrigerant pipe conduit connecting an outlet of a compressor and an inlet of a condenser, a second refrigerant pipe conduit connecting an outlet of the condenser and an inlet of the first heat exchanger, a third refrigerant pipe conduit connecting the second refrigerant pipe conduit and an inlet of the second heat exchanger, a fourth refrigerant pipe conduit connecting an outlet of the first heat exchanger and an inlet of the compressor, a fifth refrigerant pipe conduit connecting an outlet of the second heat exchanger and the fourth refrigerant pipe conduit, a sixth refrigerant pipe conduit that branches off from the first refrigerant pipe conduit and that is connected to the inlet of the first heat exchanger, and a seventh refrigerant pipe conduit that branches off from the sixth refrigerant pipe conduit and that is connected to the inlet of the second heat exchanger. A first expansion valve may be connected to the second refrigerant pipe conduit. A second expansion valve may be connected to the third refrigerant pipe conduit. A third expansion valve may be connected to the sixth refrigerant pipe conduit. A fourth expansion valve may be connected to the seventh refrigerant pipe conduit.

Advantageous Effects of Invention

The chiller of the present invention is configured to supply a coolant, by using the tank and the pump, so as to be distributed to the plurality of coolant circuits and is configured to control the temperatures of the coolant in the respective coolant circuits so as to be different preset temperatures by the respective heat exchangers capable of individually controlling heat exchange performance. Thus, the chiller of the present invention is reduced in size, cost, and energy use compared with publicly known chillers including a plurality of coolant circuits each including a dedicated tank and a dedicated pump.

DESCRIPTION OF EMBODIMENTS

Figure 1:
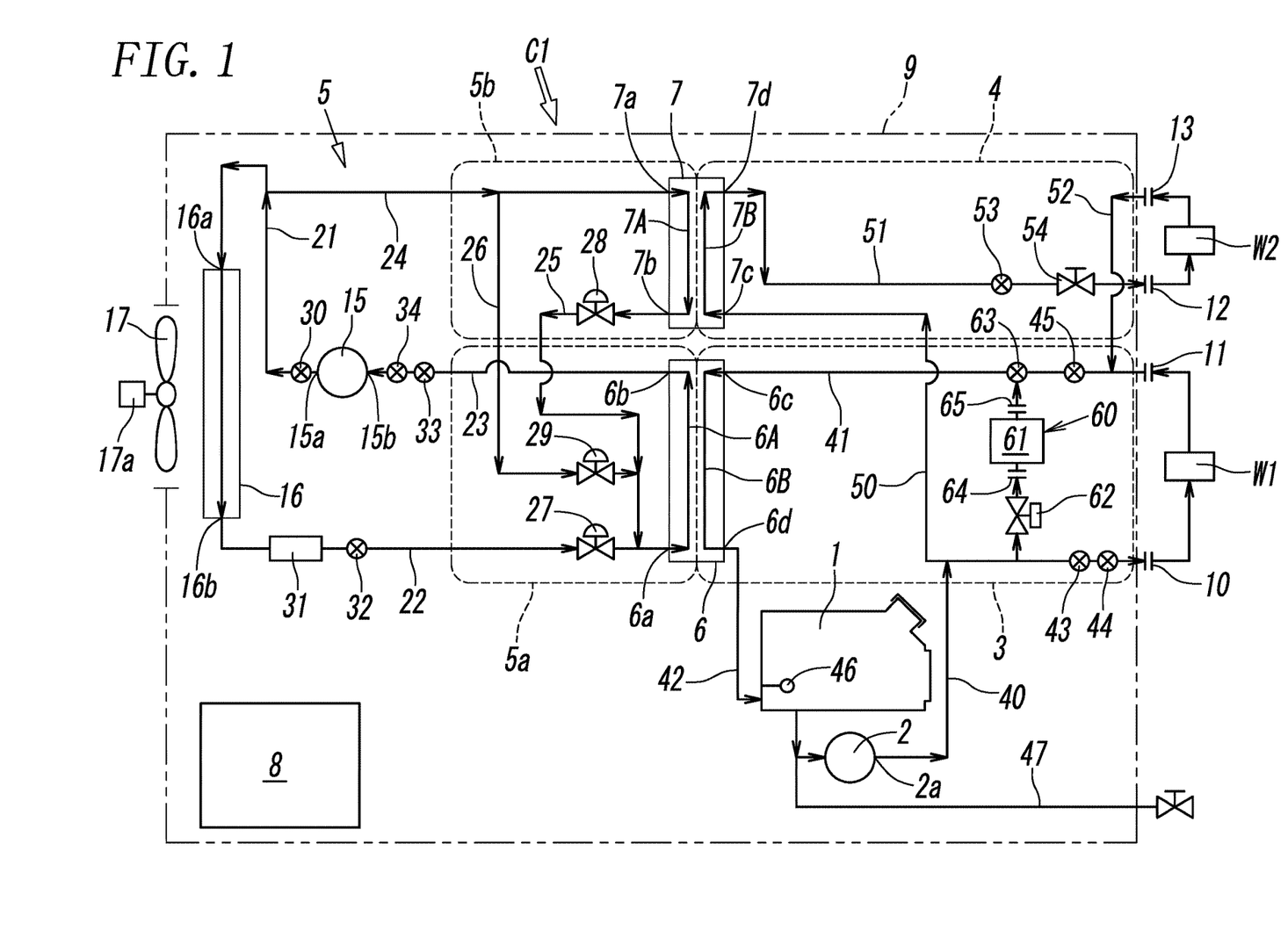
FIG. 1 is a circuit diagram illustrating, with signs, a chiller of a first embodiment according to the present invention.

A chiller C1 of a first embodiment illustrated in FIG. 1 is configured to cool two loads W1 and W2, which have different temperatures, with a coolant and thus configured to keep respective temperatures thereof constant. The chiller C1 includes a tank 1, which contains a coolant, a pump 2, which is configured to discharge the coolant in the tank 1, two coolant circuits 3 and 4, to which the coolant discharged from the pump 2 is distributed and which are configured to supply the coolant to the two respective loads W1 and W2, a refrigeration circuit 5, which is configured to control the temperature of the coolant in each of the two coolant circuits 3 and 4 so as to be the corresponding preset temperature, two heat exchangers 6 and 7, which individually connect the refrigeration circuit 5 and the two coolant circuits 3 and 4, respectively, and a controller 8, which is configured to control the whole of the chiller. In the present embodiment, pure water is used as the coolant.

The first load W1, which is one of the two loads W1 and W2, is a laser oscillator of a laser welding apparatus and is a low-temperature load. The second load W2, which is the other of the two loads W1 and W2, is a probe configured to radiate laser light and is a load having a temperature higher than that of the laser oscillator.

In addition, of the two coolant circuits 3 and 4, the first coolant circuit 3 cools the first load W1, and the second coolant circuit 4 cools the second load W2.

Furthermore, of the two heat exchangers 6 and 7, the first heat exchanger 6 connects the first coolant circuit 3 and the refrigeration circuit 5, and the second heat exchanger 7 connects the second coolant circuit 4 and the refrigeration circuit 5.

In addition, for example, in the first coolant circuit 3, the temperature of the coolant to be supplied to the first load W1 is set to an optimum temperature in the range of 10 to 30° C., preferably 15 to 25° C., and the flow rate of the coolant is set to an optimum flow rate in the range of 20 to 80 L/min.

On the other hand, in the second coolant circuit 4, the temperature of the coolant to be supplied to the second load W2 is set to an optimum temperature in the range of 10 to 50° C., preferably 20 to 40° C., and the flow rate of the coolant is set to an optimum flow rate in the range of 2 to 10 L/min. However, the preset temperature of the coolant to be supplied to the second load W2 has to be equal to or higher than the preset temperature of the coolant to be supplied to the first load W1.

The refrigeration circuit 5, the tank 1, the pump 2, and the two coolant circuits 3 and 4 are contained in a casing 9. The two loads W1 and W2 are disposed outside the casing 9. A supply-side load connection port 10 and a return-side load connection port 11, which are used for connecting the first load W1 to the first coolant circuit 3, and a supply-side load connection port 12 and a return-side load connection port 13, which are used for connecting the second load W2 to the second coolant circuit 4, are provided at an outer side surface of the casing 9.

The refrigeration circuit 5 includes a compressor 15, which is configured to compress a gas refrigerant into a high-temperature, high-pressure gas refrigerant, and a condenser 16, which is configured to cool, into a low-temperature, high-pressure liquid refrigerant, the high-temperature, high-pressure gas refrigerant sent from the compressor 15. The condenser 16 is an air-cooled condenser 16 configured to cool a refrigerant with a fan 17 driven by an electric motor 17*a*. The electric motor 17*a* and the compressor 15 are electrically connected to the controller 8. For example, the rotation rate and the output of each of the electric motor 17*a* and the compressor 15 are controlled by inverter control with the controller 8. However, the condenser 16 may be a water-cooled condenser.

In addition, the refrigeration circuit 5 includes a first refrigerant pipe conduit 21, which connects an outlet 15*a* of the compressor 15 and an inlet 16*a* of the condenser 16, a second refrigerant pipe conduit 22, which connects an outlet 16*b* of the condenser 16 and an inlet 6*a* of the first heat exchanger 6, a third refrigerant pipe conduit 23, which connects an outlet 6*b* of the first heat exchanger 6 and an inlet 15*b* of the compressor 15, a fourth refrigerant pipe conduit 24, which connects the first refrigerant pipe conduit 21 and an inlet 7*a* of the second heat exchanger 7, a fifth refrigerant pipe conduit 25, which connects an outlet 7*b* of the second heat exchanger 7 and the inlet 6*a* of the first heat exchanger 6, and a sixth refrigerant pipe conduit 26, which connects the fourth refrigerant pipe conduit 24 and the fifth refrigerant pipe conduit 25. A first expansion valve 27 is connected to the second refrigerant pipe conduit 22. A second expansion valve 28 is connected to a position, in the fifth refrigerant pipe conduit 25, closer to the outlet 7*b* of the second heat exchanger 7 than the position, in the fifth refrigerant pipe conduit 25, where the sixth refrigerant pipe conduit 26 is connected. A third expansion valve 29 is connected to the sixth refrigerant pipe conduit 26.

The first heat exchanger 6 and the second heat exchanger 7 respectively include refrigerant passage portions 6A and 7A, through which a refrigerant flows, and coolant passage portions 6B and 7B, through which a coolant flows. The first heat exchanger 6 and the second heat exchanger 7 are respectively configured to exchange heat between a refrigerant flowing in the refrigerant passage portions 6A and 7A and a coolant flowing in the coolant passage portions 6B and 7B. Thus, in the refrigeration circuit 5, the inlets of the first heat exchanger 6 and the second heat exchanger 7 are the inlets 6*a* and 7*a* of the refrigerant passage portions 6A and 7A, and the outlets of the first heat exchanger 6 and the second heat exchanger 7 are the outlets 6*b* and 7*b* of the refrigerant passage portions 6A and 7A. In addition, in the first coolant circuit 3 and the second coolant circuit 4, which will be described later, the inlets of the first heat exchanger 6 and the second heat exchanger 7 are inlets 6*c* and 7*c* of the coolant passage portions 6B and 7B, and the outlets of the first heat exchanger 6 and the second heat exchanger 7 are outlets 6*d* and 7*d* of the coolant passage portions 6B and 7B.

The first expansion valve 27, the second expansion valve 28, and the third expansion valve 29 are electronic expansion valves each capable of freely controlling the opening degree thereof with a stepping motor. These expansion valves are electrically connected to the controller 8. The controller 8 controls the opening degree of each of the expansion valves 27, 28, and 29.

A first refrigerant temperature sensor 30, which is configured to detect the temperature of a refrigerant discharged from the compressor 15, is connected to the first refrigerant pipe conduit 21. A refrigerant filter 31, which is configured to remove foreign matter in a refrigerant, and a first refrigerant pressure sensor 32, which is configured to detect the pressure of this refrigerant, are connected to positions, between the condenser 16 and the first expansion valve 27, in the second refrigerant pipe conduit 22. A second refrigerant pressure sensor 33, which is configured to detect the pressure of a refrigerant that returns from the first heat exchanger 6 to the compressor 15, and a second refrigerant temperature sensor 34, which is configured to detect the temperature of this refrigerant, are connected to the third refrigerant pipe conduit 23.

The refrigerant temperature sensors 30 and 34 and the refrigerant pressure sensors 32 and 33 are electrically connected to the controller 8. The controller 8 controls, for example, the rotation rate and the output of each of the compressor 15 and the fan 17 on the basis of measured refrigerant temperatures and measured refrigerant pressures.

The first coolant circuit 3 includes a first supply pipe conduit 40, which connects a discharge port 2*a* of the pump 2 and the supply-side load connection port 10, a first return pipe conduit 41, which connects the return-side load connection port 11 and the inlet 6*c* of the first heat exchanger 6, and an inflow pipe conduit 42, which connects the outlet 6*d* of the first heat exchanger 6 and the tank 1.

Thus, in the first coolant circuit 3, the coolant discharged from the tank 1 by the pump 2 is supplied to the first load W1 through the first supply pipe conduit 40 to cool the first load W1 such that the temperature of the coolant is kept to a first preset temperature, which is the temperature of the coolant in the tank 1. Then, the coolant whose temperature is increased by cooling the first load W1 is sent to the first heat exchanger 6 through the first return pipe conduit 41. The temperature of the coolant is controlled by the first heat exchanger 6 to return to the first preset temperature. Thereafter, the coolant flows into the tank 1 through the inflow pipe conduit 42.

A first temperature sensor 43, which is configured to detect the temperature of the coolant to be supplied to the first load W1, and a pressure sensor 44, which is configured to detect the pressure of the coolant, are connected to the first supply pipe conduit 40. A second temperature sensor 45, which is configured to detect the temperature of the coolant to be returned from the first load W1 to the tank 1, is connected to the first return pipe conduit 41.

The first temperature sensor 43, the second temperature sensor 45, and the pressure sensor 44 are electrically connected to the controller 8. The controller 8 controls the opening degree of each of the expansion valves 27, 28, and 29 on the basis of temperatures of the coolant measured by the first temperature sensor 43 and the second temperature sensor 45 to control the heat exchange performance of the first heat exchanger 6. The controller 8 controls the pump 2 on the basis of a pressure of the coolant measured by the pressure sensor 44.

In the figures, the member assigned a reference sign 46 is a level switch configured to detect a level of the coolant in the tank 1, and the member assigned a reference sign 47 is a drainage pipe.

In addition, the pump 2 is a non-immersion pump installed outside the tank 1.

On the other hand, the second coolant circuit 4 includes a branch pipe conduit 50, which branches off from the first supply pipe conduit 40 of the first coolant circuit 3 and which is connected to the inlet 7*c* of the second heat exchanger 7, a second supply pipe conduit 51, which connects the outlet 7*d* of the second heat exchanger 7 and the supply-side load connection port 12, and a second return pipe conduit 52, which connects the return-side load connection port 13 and the first return pipe conduit 41 of the first coolant circuit 3. The position where the second return pipe conduit 52 is connected to the first return pipe conduit 41 is a position (closer to the return-side load connection port 11) upstream of the position where the second temperature sensor 45 is provided.

With this configuration, in the second coolant circuit 4, the coolant discharged by the pump 2 is sent to the second heat exchanger 7 through the branch pipe conduit 50. The temperature of the coolant is controlled by the second heat exchanger 7 so as to be a second preset temperature different from the first preset temperature. Thereafter, the coolant is sent to the second load W2 through the second supply pipe conduit 51 to cool the second load W2. Then, the coolant whose temperature is increased by cooling the second load W2 flows into the first return pipe conduit 41 through the second return pipe conduit 52 and joins the coolant in the first coolant circuit 3 flowing in the first return pipe conduit 41. The joined coolant is sent to the first heat exchanger 6. The temperature of the joined coolant is controlled by the first heat exchanger 6 to return to the first preset temperature. Thereafter, the joined coolant flows into the tank 1 through the inflow pipe conduit 42.

Here, the second load W2 has a temperature higher than that of the first load W1. Thus, the preset temperature (second preset temperature) of the coolant in the second coolant circuit 4 is higher than the preset temperature (first preset temperature) of the coolant in the first coolant circuit 3. Accordingly, the second heat exchanger 7 is configured to heat the coolant, whose temperature is kept to the first preset temperature, sent from the tank 1 via the first coolant circuit 3 and the branch pipe conduit 50 to increase the temperature of the coolant to the second preset temperature. Thus, the second heat exchanger 7 can be referred to as a heat exchanger for heating.

A third temperature sensor 53, which is configured to detect the temperature of the coolant to be supplied to the second load W2, and a pressure control valve 54, which is configured to change the pressure of this coolant, are connected in series to the second supply pipe conduit 51.

The third temperature sensor 53 and the pressure control valve 54 are electrically connected to the controller 8. The controller 8 controls the opening degree of the second expansion valve 28 on the basis of a temperature of the coolant measured by the third temperature sensor 53 to control the heat exchange performance of the second heat exchanger 7. In addition, when the pressure of the coolant flowing in the second supply pipe conduit 51 has to be a pressure different from the pressure of the coolant flowing in the first supply pipe conduit 40, the controller 8 controls the pressure control valve 54. However, the pressure control valve 54 may be a manually operated valve.

In addition, a filtering pipe conduit 60, which is used for purifying the coolant whose purity is reduced due to an increase in the amount of ionic substances therein, is provided in the first coolant circuit 3. One end of the filtering pipe conduit 60 is connected to a position (closer to the first load W1) downstream of the position, in the first supply pipe conduit 40, where the branch pipe conduit 50 branches off. The other end of the filtering pipe conduit 60 is connected to a position (closer to the first heat exchanger 6) downstream of the position, in the first return pipe conduit 41, where the second return pipe conduit 52 is connected. A DI filter 61, which is configured to remove ionic substances, and an electromagnetic valve 62, which is configured to open and close the filtering pipe conduit 60, are connected in series to the filtering pipe conduit 60. In addition, a DI sensor 63, which is configured to measure the electrical conductivity of the coolant, is connected to the point where the filtering pipe conduit 60 and the first return pipe conduit 41 join together.

The DI filter 61 is configured to adsorb the ionic substances in the coolant on a resin surface by ion exchange to remove the ionic substances. The DI filter 61 is detachably connected to filter connection portions 64 and 65, which are formed in the filtering pipe conduit 60. The DI filter 61 may be disposed in the casing 9 or disposed outside the casing 9.

In addition, the electromagnetic valve 62 and the DI sensor 63 are electrically connected to the controller 8. The controller 8 controls opening and closing of the electromagnetic valve 62 according to an electrical conductivity measured by the DI sensor 63.

The filtering pipe conduit 60 operates as follows. That is, when the electrical conductivity of the coolant in the first return pipe conduit 41 measured by the DI sensor 63 is higher than a reference value due to an increase in the amount of ionic substances therein, the electrical conductivity of the coolant in the tank 1, to which the coolant in the first return pipe conduit 41 returns, is also high. Thus, the controller 8 opens the electromagnetic valve 62, and the coolant in the first supply pipe conduit 40 flows into the filtering pipe conduit 60 to remove the ionic substances in the coolant with the DI filter 61. The purified coolant is sent to the tank 1 through the first return pipe conduit 41. The coolant in the tank 1 is purified by continuing this operation. As a result, it is possible to keep the coolant in the first coolant circuit 3 and the coolant in the second coolant circuit 4 always having the same purity (liquid quality).

The chiller C1 of the first embodiment operates as follows.

In the refrigeration circuit 5, a high-temperature, high-pressure gas refrigerant discharged from the compressor 15 is cooled into a low-temperature, high-pressure liquid refrigerant by the condenser 16. Thereafter, the low-temperature, high-pressure liquid refrigerant is sent from the second refrigerant pipe conduit 22 to the first heat exchanger 6 through the first expansion valve 27 and is subjected to heat exchange with the coolant in the first coolant circuit 3 by the first heat exchanger 6 to cool the coolant to the first preset temperature. Thereafter, the refrigerant subjected to heat exchange returns to the compressor 15 through the third refrigerant pipe conduit 23.

In addition, part of the high-temperature, high-pressure gas refrigerant discharged from the compressor 15 is directly sent to the second heat exchanger 7 through the fourth refrigerant pipe conduit 24 and is subjected to heat exchange with the coolant in the second coolant circuit 4 by the second heat exchanger 7 to heat the coolant to the second preset temperature. Thereafter, the refrigerant subjected to heat exchange flows into the first heat exchanger 6 through the second expansion valve 28 in a fifth refrigerant pipe conduit 25. Then, the gas refrigerant is condensed by heating the coolant by the second heat exchanger 7 and is thereafter expanded by the second expansion valve 28 to further reduce the temperature thereof. The refrigerant whose temperature is further reduced joins the refrigerant in the second refrigerant pipe conduit 22. The joined refrigerant flows into the first heat exchanger 6 and serves to improve the cooling performance of the first heat exchanger 6 in an auxiliary manner. This is because the second expansion valve 28 is connected between the outlet of the second heat exchanger 7 and the inlet of the first heat exchanger 6, and the second heat exchanger 7 thus functions as the condenser 16.

Furthermore, part of the high-temperature, high-pressure gas refrigerant discharged from the compressor 15 is sent from the sixth refrigerant pipe conduit 26 to the first heat exchanger 6 via the third expansion valve 29 and is used for controlling the temperature of the refrigerant that flows into the first heat exchanger 6.

On the other hand, in the first coolant circuit 3, the coolant, in the tank 1, whose temperature is controlled so as to be the first preset temperature is discharged from the pump 2 and is thereafter sent to the first load W1 through the first supply pipe conduit 40 to cool the first load W1 such that the temperature of the coolant is kept to the first preset temperature.

The coolant whose temperature is increased by cooling the first load W1 is sent to the first heat exchanger 6 through the first return pipe conduit 41. The temperature of the coolant is controlled by the first heat exchanger 6 so as to be the first preset temperature. Thereafter, the coolant flows into the tank 1 through the inflow pipe conduit 42.

The temperature of the coolant is always measured by the first temperature sensor 43 and the second temperature sensor 45. The controller 8 controls the opening degree of each of the first expansion valve 27 and the third expansion valve 29 in the refrigeration circuit 5 on the basis of measured temperatures of the coolant to control the temperature of the coolant so as to be the first preset temperature.

For example, when a temperature of the coolant measured by the first temperature sensor 43 is higher than the first preset temperature, the temperature of the coolant has to be reduced by improving the cooling performance of the first heat exchanger 6. Thus, the opening degree of the first expansion valve 27 in the refrigeration circuit 5 is increased to increase the flow rate of a low-temperature refrigerant. In addition, the opening degree of the third expansion valve 29 in the refrigeration circuit 5 is reduced to reduce the flow rate of a high-temperature refrigerant. As a result, the temperature of the refrigerant that flows into the first heat exchanger 6 is reduced to improve the cooling performance of the first heat exchanger 6. Accordingly, the coolant is cooled to control the temperature thereof so as to be the first preset temperature.

Conversely, when the temperature of the coolant is lower than the first preset temperature, the temperature of the coolant has to be increased by heating the coolant by the first heat exchanger 6. Thus, the opening degree of the first expansion valve 27 is reduced to reduce the flow rate of the low-temperature refrigerant. In addition, the opening degree of the third expansion valve 29 is increased to increase the flow rate of the high-temperature refrigerant. As a result, the temperature of the refrigerant that flows into the first heat exchanger 6 is increased, and the coolant is heated by the refrigerant whose temperature is increased to control the temperature thereof so as to be the first preset temperature.

In addition, in the second coolant circuit 4, part of the coolant that has the first preset temperature and that is discharged from the pump 2 flows into the second heat exchanger 7 through the branch pipe conduit 50 and is heated by being subjected to heat exchange with the high-temperature, high-pressure gas refrigerant by the second heat exchanger 7. The temperature of the part of the coolant is controlled so as to be the second preset temperature higher than the first preset temperature. Thereafter, the part of the coolant is sent to the second load W2 through the second supply pipe conduit 51 to cool the second load W2.

The coolant whose temperature is increased by cooling the second load W2 flows into the first return pipe conduit 41 through the second return pipe conduit 52 and joins the coolant flowing, from the first load W1, in the first return pipe conduit 41. The joined coolant is sent to the first heat exchanger 6. The temperature of the joined coolant is controlled by the first heat exchanger 6 to return to the first preset temperature. Thereafter, the joined coolant flows into the tank 1 through the inflow pipe conduit 42.

The temperature of the coolant to be supplied to the second load W2 is always measured by the third temperature sensor 53 connected to the second supply pipe conduit 51. The controller 8 controls the opening degree of the second expansion valve 28 in the refrigeration circuit 5 on the basis of a measured temperature of the coolant to control the temperature of the coolant so as to be the second preset temperature.

For example, when the temperature of the coolant that flows in the second supply pipe conduit 51 is higher than the second preset temperature, the temperature of the coolant has to be reduced. Thus, the opening degree of the second expansion valve 28 in the refrigeration circuit 5 is reduced, or the second expansion valve 28 is closed to reduce the heating performance of the second heat exchanger 7. As a result, the temperature of the coolant is reduced and is thus controlled so as to be the second preset temperature.

Conversely, when the temperature of the coolant that flows in the second supply pipe conduit 51 is lower than the second preset temperature, the temperature of the coolant has to be increased. Thus, the opening degree of the second expansion valve 28 is increased to increase the flow rate of the high-temperature refrigerant that flows into the second heat exchanger 7. As a result, the coolant is heated to control the temperature thereof so as to be the second preset temperature.

In addition, an increase in the amount of ionic substances in the coolant increases the electrical conductivity of the coolant. When an electrical conductivity thereof measured by the DI sensor 63 is higher than a reference value, the electromagnetic valve 62 opens to open the filtering pipe conduit 60. Then, the coolant flows in the filtering pipe conduit 60 to remove the ionic substances in the coolant with the DI filter 61.

In this case, part of the coolant can be filtered by flowing in the filtering pipe conduit 60 while the coolant continues to cool the loads, and the whole coolant can be filtered by flowing in the filtering pipe conduit 60 while the coolant stops cooling the loads.

Figure 2:
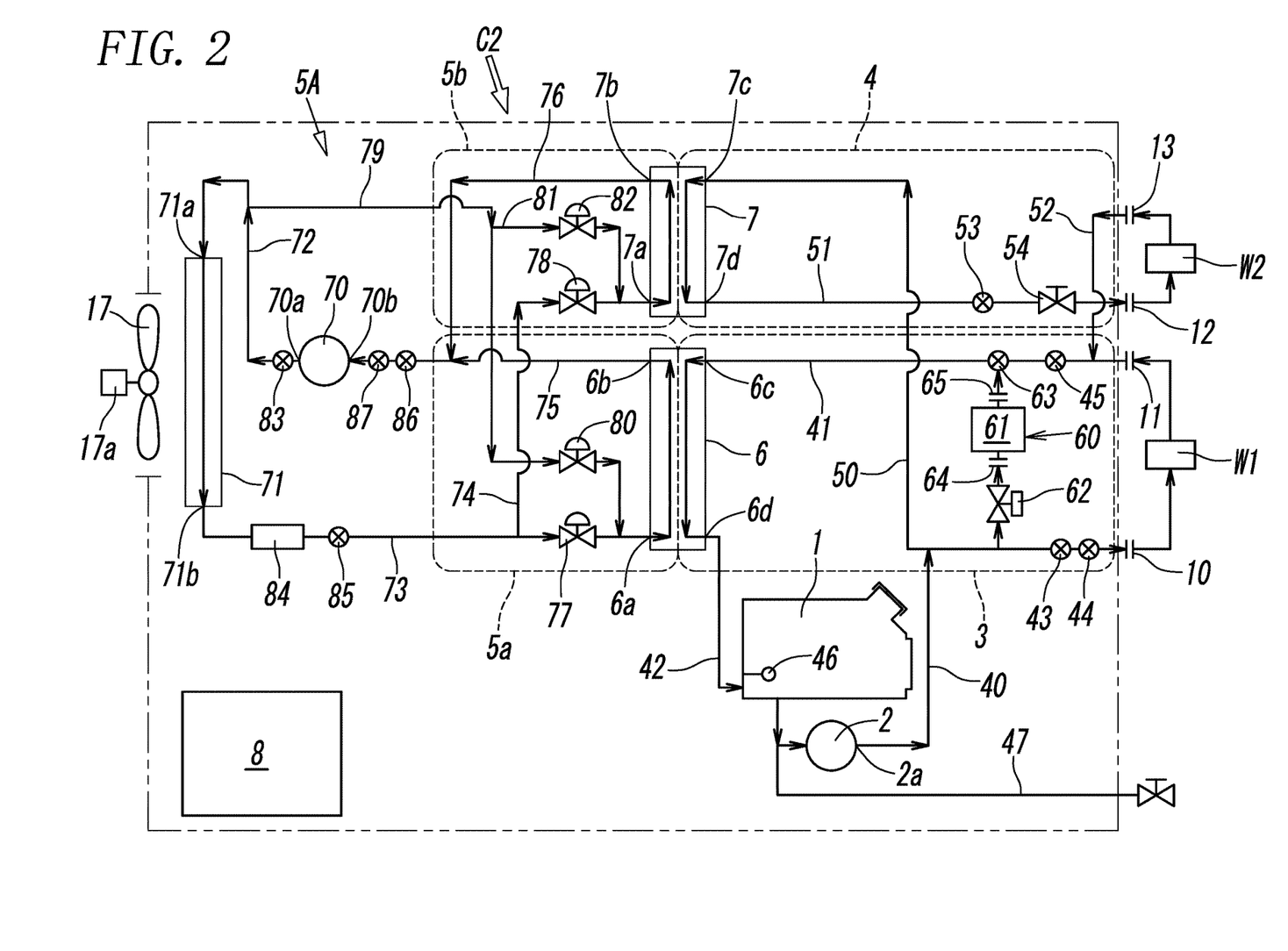
FIG. 2 is a circuit diagram illustrating, with signs, a chiller of a second embodiment according to the present invention.

FIG. 2 illustrates a chiller C2 of a second embodiment. The chiller C2 differs from the chiller C1 of the first embodiment in the configuration of a refrigeration circuit 5A. The configurations of the first coolant circuit 3 and the second coolant circuit 4 and the configurations of the first heat exchanger 6 and the second heat exchanger 7 are the same as those of the chiller of the first embodiment.

Thus, the configuration of the refrigeration circuit 5A will be described below. The first coolant circuit 3, the second coolant circuit 4, the first heat exchanger 6, and the second heat exchanger 7 have the same reference signs as respective reference signs used in the first embodiment, and descriptions thereof are omitted.

The refrigeration circuit 5A includes a first refrigerant pipe conduit 72, which connects an outlet 70a of a compressor 70 and an inlet 71a of a condenser 71, a second refrigerant pipe conduit 73, which connects an outlet 71b of the condenser 71 and the inlet 6a of the first heat exchanger 6, a third refrigerant pipe conduit 74, which branches off from the second refrigerant pipe conduit 73 and which is connected to the inlet 7a of the second heat exchanger 7, a fourth refrigerant pipe conduit 75, which connects the outlet 6b of the first heat exchanger 6 and an inlet 70b of the compressor 70, and a fifth refrigerant pipe conduit 76, which connects the outlet 7b of the second heat exchanger 7 and the fourth refrigerant pipe conduit 75. A first expansion valve 77 is connected to a position, in the second refrigerant pipe conduit 73, closer to the first heat exchanger 6 than the position, in the second refrigerant pipe conduit 73, where the third refrigerant pipe conduit 74 branches off. A second expansion valve 78 is connected to the third refrigerant pipe conduit 74.

In addition, a sixth refrigerant pipe conduit 79, which branches off from the first refrigerant pipe conduit 72, is connected to the second refrigerant pipe conduit 73 at a position closer to the inlet 6a of the first heat exchanger 6 than the first expansion valve 77. A third expansion valve 80 is connected to the sixth refrigerant pipe conduit 79. Furthermore, a seventh refrigerant pipe conduit 81, which branches off from the sixth refrigerant pipe conduit 79, is connected to the third refrigerant pipe conduit 74 at a position closer to the inlet 7a of the second heat exchanger 7 than the second expansion valve 78. A fourth expansion valve 82 is connected to the seventh refrigerant pipe conduit 81.

A first refrigerant temperature sensor 83, which is configured to detect the temperature of a refrigerant discharged from the compressor 70, is connected to the first refrigerant pipe conduit 72. A refrigerant filter 84, which is configured to remove foreign matter in a refrigerant that flows out from the condenser 71, and a first refrigerant pressure sensor 85, which is configured to detect the pressure of this refrigerant, are connected to the second refrigerant pipe conduit 73. A second refrigerant pressure sensor 86, which is configured to detect the pressure of a refrigerant that returns from each of the first heat exchanger 6 and the second heat exchanger 7 to the compressor 70, and a second refrigerant temperature sensor 87, which is configured to detect the temperature of this refrigerant, are connected to the fourth refrigerant pipe conduit 75.

The chiller of the second embodiment operates as follows.

In the refrigeration circuit 5A, a high-temperature, high-pressure gas refrigerant discharged from the compressor 70 is cooled into a low-temperature, high-pressure liquid refrigerant by the condenser 71. Thereafter, the low-temperature, high-pressure liquid refrigerant is sent from the second refrigerant pipe conduit 73 to the first heat exchanger 6 through the first expansion valve 77 and is sent from the third refrigerant pipe conduit 74 to the second heat exchanger 7 through the second expansion valve 78. Then, the low-temperature, high-pressure liquid refrigerant is subjected to heat exchange with the coolant in the first coolant circuit 3 by the first heat exchanger 6 to control the temperature of this coolant so as to be the first preset temperature and is subjected to heat exchange with the coolant in the second coolant circuit 4 by the second heat exchanger 7 to control the temperature of this coolant so as to be the second preset temperature. Then, the refrigerant that has flowed out from each of the first heat exchanger 6 and the second heat exchanger 7 returns to the inlet 70b of the compressor 70 through the fourth refrigerant pipe conduit 75 or the fifth refrigerant pipe conduit 76.

In addition, part of the high-temperature, high-pressure gas refrigerant discharged from the compressor 70 is sent to the first heat exchanger 6 via the sixth refrigerant pipe conduit 79 and the third expansion valve 80, is sent to the second heat exchanger 7 via the seventh refrigerant pipe conduit 81 and the fourth expansion valve 82, and is used for controlling the temperature of the refrigerant that flows into each of the heat exchangers 6 and 7.

On the other hand, in the first coolant circuit 3, the coolant, in the tank 1, whose temperature is controlled so as to be the first preset temperature is discharged from the pump 2 and is thereafter sent to the first load W1 through the first supply pipe conduit 40 to cool the first load W1 such that the temperature of the coolant is kept to the first preset temperature.

The coolant whose temperature is increased by cooling the first load W1 is sent to the first heat exchanger 6 through the first return pipe conduit 41. The temperature of the coolant is returned to the first preset temperature by the first heat exchanger 6. Thereafter, the coolant flows into the tank 1 through the inflow pipe conduit 42.

The temperature of the coolant is always measured by the first temperature sensor 43 and the second temperature sensor 45. The controller 8 controls the opening degree of each of the first expansion valve 77 and the third expansion valve 80 in the refrigeration circuit 5A on the basis of measured temperatures of the coolant to control the temperature of the coolant so as to be the first preset temperature.

For example, when a temperature of the coolant measured by the first temperature sensor 43 is higher than the first preset temperature, the temperature of the coolant has to be reduced by improving the cooling performance of the first heat exchanger 6. Thus, the opening degree of the first expansion valve 77 in the refrigeration circuit 5A is increased to increase the flow rate of a low-temperature refrigerant. In addition, the opening degree of the third expansion valve 80 in the refrigeration circuit 5A is reduced to reduce the flow rate of a high-temperature refrigerant. As a result, the temperature of the refrigerant that flows into the first heat exchanger 6 is reduced to improve the cooling performance of the first heat exchanger 6. Accordingly, the coolant is cooled to control the temperature thereof so as to be the first preset temperature.

Conversely, when the temperature of the coolant is lower than the first preset temperature, the temperature of the coolant has to be increased by heating the coolant by the first heat exchanger 6. Thus, the opening degree of the first expansion valve 77 is reduced to reduce the flow rate of the low-temperature refrigerant. In addition, the opening degree of the third expansion valve 80 is increased to increase the flow rate of the high-temperature refrigerant. As a result, the temperature of the refrigerant that flows into the first heat exchanger 6 is increased, and the coolant is heated by the refrigerant whose temperature is increased to control the temperature thereof so as to be the first preset temperature.

In addition, in the second coolant circuit 4, part of the coolant that has the first preset temperature and that is discharged from the pump 2 flows into the second heat exchanger 7 through the branch pipe conduit 50 and is heated by being subjected to heat exchange with the refrigerant by the second heat exchanger 7. The temperature of the part of the coolant is controlled so as to be the second preset temperature higher than the first preset temperature. Thereafter, the part of the coolant is sent to the second load W2 through the second supply pipe conduit 51 to cool the second load W2.

The coolant whose temperature is increased by cooling the second load W2 flows into the first return pipe conduit 41 through the second return pipe conduit 52 and joins the coolant flowing from the first load W1. The joined coolant is sent to the first heat exchanger 6. The temperature of the joined coolant is controlled by the first heat exchanger 6 to return to the first preset temperature. Thereafter, the joined coolant flows into the tank 1 through the inflow pipe conduit 42.

The temperature of the coolant to be supplied to the second load W2 is always measured by the third temperature sensor 53 connected to the second supply pipe conduit 51. The controller 8 controls the opening degree of each of the second expansion valve 78 and the fourth expansion valve 82 in the refrigeration circuit 5A on the basis of a measured temperature of the coolant to control the temperature of the coolant so as to be the second preset temperature.

For example, when a temperature of the coolant measured by the third temperature sensor 53 is higher than the second preset temperature, the temperature of the coolant has to be reduced by improving the cooling performance of the second heat exchanger 7. Thus, the opening degree of the second expansion valve 78 in the refrigeration circuit 5A is increased to increase the flow rate of the low-temperature refrigerant. In addition, the opening degree of the fourth expansion valve 82 in the refrigeration circuit 5A is reduced to reduce the flow rate of the high-temperature refrigerant. As a result, the temperature of the refrigerant that flows into the second heat exchanger 7 is reduced to improve the cooling performance of the second heat exchanger 7. Accordingly, the coolant is cooled to control the temperature thereof so as to be the second preset temperature.

Conversely, when the temperature of the coolant is lower than the second preset temperature, the temperature of the coolant has to be increased by heating the coolant by the second heat exchanger 7. Thus, the opening degree of the second expansion valve 78 is reduced to reduce the flow rate of the low-temperature refrigerant. In addition, the opening degree of the fourth expansion valve 82 is increased to increase the flow rate of the high-temperature refrigerant. As a result, the temperature of the refrigerant that flows into the second heat exchanger 7 is increased, and the coolant is heated by the refrigerant whose temperature is increased to control the temperature thereof so as to be the second preset temperature.

In addition, when the purity of the coolant is reduced due to an increase in the amount of ionic substances in the coolant, the ionic substances are removed by the operation of the DI filter 61. This is similar to the case of the first embodiment.

The chiller C1 of the first embodiment and the chiller C2 of the second embodiment each include the two coolant circuits 3 and 4. However, chillers of the present invention can each include three or more of the coolant circuits. For example, chillers of the present invention can each include the one first coolant circuit 3 and two or more of the second coolant circuits 4. In addition, chillers of the present invention can each include two or more of the first coolant circuits 3 and the one second coolant circuit 4. In addition, chillers of the present invention can each include two or more of the first coolant circuits 3 and two or more of the second coolant circuits 4.

Here, when the chiller C1 of the first embodiment includes two or more of the first coolant circuits 3, circuit forming sections in which the respective first coolant circuits 3 and a refrigerant circuit section 5a, which includes the first expansion valve 27 and the third expansion valve 29, are connected to each other at the first heat exchanger 6 can be connected in parallel to each other. In addition, when the chiller C1 of the first embodiment includes two or more of the second coolant circuits 4, circuit forming sections in which the respective second coolant circuits 4 and a refrigerant circuit section 5b, which includes the second expansion valve 28, are connected to each other at the second heat exchanger 7 can be connected in parallel to each other.

In addition, when the chiller C2 of the second embodiment includes two or more of the first coolant circuits 3, circuit forming sections in which the respective first coolant circuits 3 and a refrigerant circuit section 5a, which includes the first expansion valve 77 and the third expansion valve 80, are connected to each other at the first heat exchanger 6 can be connected in parallel to each other. In addition, when the chiller C2 of the second embodiment includes two or more of the second coolant circuits 4, circuit forming sections in which the respective second coolant circuits 4 and a refrigerant circuit section 5b, which includes the second expansion valve 78 and the fourth expansion valve 82, are connected to each other at the second heat exchanger 7 can be connected in parallel to each other.

REFERENCE SIGNS LIST

C1, C2 chiller
W1 first load
W2 second load
1 tank
2 pump
3 first coolant circuit
4 second coolant circuit
5, 5A refrigeration circuit
6 first heat exchanger
6a, 6c inlet
6b, 6d outlet
7 second heat exchanger
7a, 7c inlet
7b, 7d outlet
8 controller
15, 70 compressor
15a, 70a outlet
15b, 70b inlet
16, 71 condenser
16a, 71a inlet
16b, 71b outlet
21, 72 first refrigerant pipe conduit
22, 73 second refrigerant pipe conduit
23, 74 third refrigerant pipe conduit
24, 75 fourth refrigerant pipe conduit
25, 76 fifth refrigerant pipe conduit
26, 79 sixth refrigerant pipe conduit
27, 77 first expansion valve
28, 78 second expansion valve
29, 80 third expansion valve
40 first supply pipe conduit
41 first return pipe conduit
50 branch pipe conduit
51 second supply pipe conduit
52 second return pipe conduit
54 pressure control valve
60 filtering pipe conduit
61 DI filter
62 electromagnetic valve
63 DI sensor
81 seventh refrigerant pipe conduit
82 fourth expansion valve

The invention claimed is:
1. A chiller comprising:
a tank that contains a coolant;
a pump configured to discharge the coolant in the tank;
a plurality of coolant circuits to which the coolant discharged by the pump is distributed and that are configured to supply the coolant to a plurality of respective loads; and
a refrigeration circuit configured to control a temperature of the coolant such that the coolant is subjected to heat exchange with a refrigerant, wherein the plurality of coolant circuits and the refrigeration circuit are connected to each other via respective heat exchangers capable of individually controlling heat exchange performance, the plurality of coolant circuits include
- a first coolant circuit configured to cool a first load, and
- a second coolant circuit configured to cool a second load having a temperature different from a temperature of the first load, a first heat exchanger connecting the first coolant circuit and the refrigeration circuit is configured to control a temperature of the coolant that returns from the first load and the second load to the tank, and a second heat exchanger connecting the second coolant circuit and the refrigeration circuit is configured to control a temperature of the coolant that is supplied from the tank to the second load.

2. The chiller according to claim 1, wherein
the first coolant circuit includes
- a first supply pipe conduit through which the coolant discharged from the pump is sent to the first load such that the temperature of the coolant is kept to a first preset temperature that is a temperature of the coolant in the tank, and
- a first return pipe conduit through which the coolant flowing from the first load returns to the tank, the first heat exchanger is connected to the first return pipe conduit, a temperature of the coolant in the first return pipe conduit is thus controlled by the first heat exchanger so as to be the first preset temperature, and the coolant thereafter flows into the tank, the second coolant circuit includes
- a branch pipe conduit that branches off from the first supply pipe conduit and that is connected to the second heat exchanger,
- a second supply pipe conduit through which the coolant whose temperature is controlled by the second heat exchanger so as to be a second preset temperature is sent to the second load, and
- a second return pipe conduit through which the coolant flowing from the second load returns to the tank, the second return pipe conduit is connected to the first return pipe conduit, and the coolant in the second return pipe conduit thus joins the coolant in the first return pipe conduit.

3. The chiller according to claim 2, wherein a pressure control valve is connected to the second supply pipe conduit and is configured to control a pressure of the coolant flowing in the second coolant circuit so as to be a pressure different from a pressure of the coolant flowing in the first coolant circuit.

4. The chiller according to claim 2, wherein
a filtering pipe conduit connecting the first supply pipe conduit and the first return pipe conduit is provided in the first coolant circuit, a deionization (DI) filter configured to control an electrical conductivity of the coolant and an electromagnetic valve configured to open and close the filtering pipe conduit are connected to the filtering pipe conduit, and a deionization (DI) sensor configured to measure an electrical conductivity of the coolant flowing in the first return pipe conduit to open and close the electromagnetic valve is connected to the first return pipe conduit.

5. The chiller according to claim 4, wherein the filtering pipe conduit connects a position, in the first supply pipe conduit, closer to the first load than a position, in the first supply pipe conduit, where the branch pipe conduit branches off and a position, in the first return pipe conduit, closer to the first heat exchanger than a position, in the first return pipe conduit, where the second return pipe conduit joins.

6. The chiller according to claim 1, wherein
the refrigeration circuit includes
- a first refrigerant pipe conduit connecting an outlet of a compressor and an inlet of a condenser,
- a second refrigerant pipe conduit connecting an outlet of the condenser and an inlet of the first heat exchanger,
- a third refrigerant pipe conduit connecting an outlet of the first heat exchanger and an inlet of the compressor,
- a fourth refrigerant pipe conduit connecting the first refrigerant pipe conduit and an inlet of the second heat exchanger,
- a fifth refrigerant pipe conduit connecting an outlet of the second heat exchanger and the inlet of the first heat exchanger, and
- a sixth refrigerant pipe conduit connecting the fourth refrigerant pipe conduit and the fifth refrigerant pipe conduit,
- a first expansion valve is connected to the second refrigerant pipe conduit,
- a second expansion valve is connected to the fifth refrigerant pipe conduit, and
- a third expansion valve is connected to the sixth refrigerant pipe conduit.

7. The chiller according to claim 1, wherein
the refrigeration circuit includes
- a first refrigerant pipe conduit connecting an outlet of a compressor and an inlet of a condenser,
- a second refrigerant pipe conduit connecting an outlet of the condenser and an inlet of the first heat exchanger,
- a third refrigerant pipe conduit connecting the second refrigerant pipe conduit and an inlet of the second heat exchanger,
- a fourth refrigerant pipe conduit connecting an outlet of the first heat exchanger and an inlet of the compressor,
- a fifth refrigerant pipe conduit connecting an outlet of the second heat exchanger and the fourth refrigerant pipe conduit,
- a sixth refrigerant pipe conduit that branches off from the first refrigerant pipe conduit and that is connected to the inlet of the first heat exchanger, and
- a seventh refrigerant pipe conduit that branches off from the sixth refrigerant pipe conduit and that is connected to the inlet of the second heat exchanger,
- a first expansion valve is connected to the second refrigerant pipe conduit,
- a second expansion valve is connected to the third refrigerant pipe conduit,
- a third expansion valve is connected to the sixth refrigerant pipe conduit, and
- a fourth expansion valve is connected to the seventh refrigerant pipe conduit.

* * * * *